United States Patent

Huber, Jr.

[11] Patent Number: 6,164,328
[45] Date of Patent: Dec. 26, 2000

[54] THREE POSITION RETAINING VALVE

[75] Inventor: Howard E. Huber, Jr., Black River, N.Y.

[73] Assignee: New York Air Brake Corporation, Watertown, N.Y.

[21] Appl. No.: 08/969,925

[22] Filed: Nov. 14, 1997

[51] Int. Cl.[7] ............................................... F16K 51/00
[52] U.S. Cl. .................. 137/599.17; 251/287; 251/297; 251/310; 137/599.18
[58] Field of Search ............................ 137/599.2, 599.16, 137/599.17, 599.18; 251/287, 310, 297

[56] References Cited

U.S. PATENT DOCUMENTS

| | | | |
|---|---|---|---|
| 2,711,191 | 6/1955 | Mueller | 137/599.2 |
| 2,713,989 | 7/1955 | Bryant | 251/900 X |
| 2,980,134 | 4/1961 | Harper | 137/599.2 |
| 2,987,078 | 6/1961 | Du Perow | 137/599.2 |
| 3,526,248 | 9/1970 | Billeter | 137/599.2 |
| 3,532,116 | 10/1970 | Scott et al. . | |
| 3,532,117 | 10/1970 | Racki . | |
| 3,567,181 | 3/1971 | Kraissl, Jr. | 251/287 X |
| 3,653,406 | 4/1972 | Racki . | |
| 3,794,071 | 2/1974 | Scott . | |
| 4,003,401 | 1/1977 | Haring | 137/599.2 |
| 4,158,369 | 6/1979 | Störzinger et al. . | |
| 4,407,483 | 10/1983 | Gachot | 251/287 |
| 4,624,281 | 11/1986 | Vidal et al. | 137/599.2 |
| 4,766,923 | 8/1988 | Roper | 137/599.2 X |
| 4,779,643 | 10/1988 | Genbauffe | 137/599.2 |
| 5,090,393 | 2/1992 | Holch | 137/599.2 X |
| 5,228,648 | 7/1993 | Stahmer . | |
| 5,375,623 | 12/1994 | Weber | 137/599.2 X |

*Primary Examiner*—Kevin Shaver
*Assistant Examiner*—John Bastianelli
*Attorney, Agent, or Firm*—Barnes & Thornburg

[57] ABSTRACT

A three position retaining valve wherein a slide in a rotating valve element has a seal which controls the connection of the inlet to the outlet for only one of three passages in the valve element. Preferably, the body, handle, valve element and slide are plastic and the handle and valve elements are unitary. The valve element is retained in the body by a flanged retaining ring and snap ring. The flanged retaining ring also retains a stop for the slide in the valve element. The handle includes a race and recesses cooperating with a stop and detent respectively on the body for the three positions.

20 Claims, 4 Drawing Sheets

6,164,328

1

THREE POSITION RETAINING VALVE

BACKGROUND AND SUMMARY OF THE INVENTION

The present invention relates to three position retaining valves and more specifically to improvement thereon.

The retaining valve is a valve connected to the exhaust output of the pipe bracket of a pneumatic rail brake. The retaining valve controls brake cylinder exhaust rate or maintains, for example, a 20 PSIG brake cylinder air pressure as controlled by the position of the manually operated valve handle. Although four positions have been used, the present American Association of Railroads ("AAR") standards are three positions, namely, direct exhaust, slow direct and high pressure retain. A typical example is illustrated in FIG. 1 and is available from New York Air Brake, having part number NY-3. The valve includes a body 10 with a mounting bracket 12. A first bore 14 is connected to an inlet 16 which receives the pressure to be exhausted or retained and a second bore 18 is connected to outlet 20 which is covered by cover 22. A ball valve element 24 is in the first bore 14 and has a handle 26 connected thereto by nut 28. Detent 30 is received in the recess 32 of the handle 26. A spring 34 is connected between snap ring 36 and the ball valve 24. A slide 38 cooperates with valve seat 40 and is biased by spring 42 to its open position. Appropriate passages in the ball valve 24 connects the first bore 14 to the second bore 18. Slide 38 is responsive to the pressure in the first bore and disconnects the communication between the first bore 14 via ball valve 24 and the outlet 20 when the pressure in bore 14 is above 20 PSIG. The body 10, the valve element 24, the handle 26 and the slide 38 are all made of metal.

The valve element may also be cylindrical instead of a ball valve element and include the slide in a bore within the cylinder as shown in FIG. 13 of U.S. Pat. No. 3,532,117. To reduce the cost from the cast iron bodies and other metal parts, it has been suggested to make the body, handle and valve element out of plastic in U.S. Pat. No. 5,228,648.

The present invention is a retaining valve having various improvements. One of the improvements is the structure of the slide and its seal. The valve element is received in a first bore of the body and includes a second bore having the slide therein. The valve element is rotatable by handle between first, second and third angular positions connecting the inlet of the housing to the outlet through first, second and third passages in the valve elements respectively for each of the angular positions. The slide extends from a point between the inlet and the connection of the first, second and third passages to the second bore to a point past the connection of the first, second and third passages to the second bore with respect to the inlet. A seal is at a position on the slide which is past the connection of the first and second passages to the second bore with respect to the inlet for all positions of the slide and which is past the connection of the third passage to the second bore with respect to the inlet only when the inlet pressure is above a minimal level. Preferably, the body, valve element and slide are made of plastic and the handle is a unitary one piece with the valve element.

Another improvement is the retention of the valve element in the body with respect to axial movement. The retainer includes a first ring concentric to the valve element and having a radial flange engaging the body at a first surface of the flange. A snap ring is mounted on the valve element adjacent to a second facing the flange. The first ring is fixed to rotate with the valve element. A spring is provided

2 between a first end of the slide and an end wall of the second bore and a stop is provided in the second bore adjacent to the second end of the slide. The stop includes a pin extending from the valve element across the second bore. The first ring is concentric to and retains the pin on the valve element.

Another improvement to the retaining valve is wherein the handle includes a race having a first and second ends and the body includes a stop riding in the race and engaging the ends of the race at the first and second angular positions of the valve element respectively. A detent is also provided between the handle and the body locking the valve element in the first, second and third angular positions.

These improved structures allow an improved method of assembly. A method of assembly includes inserting the valve with the handle thereon in a first end of the first bore of the housing. The slide is inserted in the second end of the second bore in the valve element and a stop for the slide is inserted adjacent the second end of the second bore. The retainer is applied adjacent the second end of the valve element and a second end of the first bore to secure the valve element to the body with respect to the axial movement. The spring is inserted in the second end of the second bore before the insertion of the slide. The stop is a pin which is inserted in the pair of opposing holes in the valve element and the retainer is applied concentric to the pin to retain it in the valve element. The retainer includes the first ring mounted concentric to the valve element with its radial flange engaging the body at a first surface of the flange. The snap ring is then mounted on the valve element adjacent the second face of the flange.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
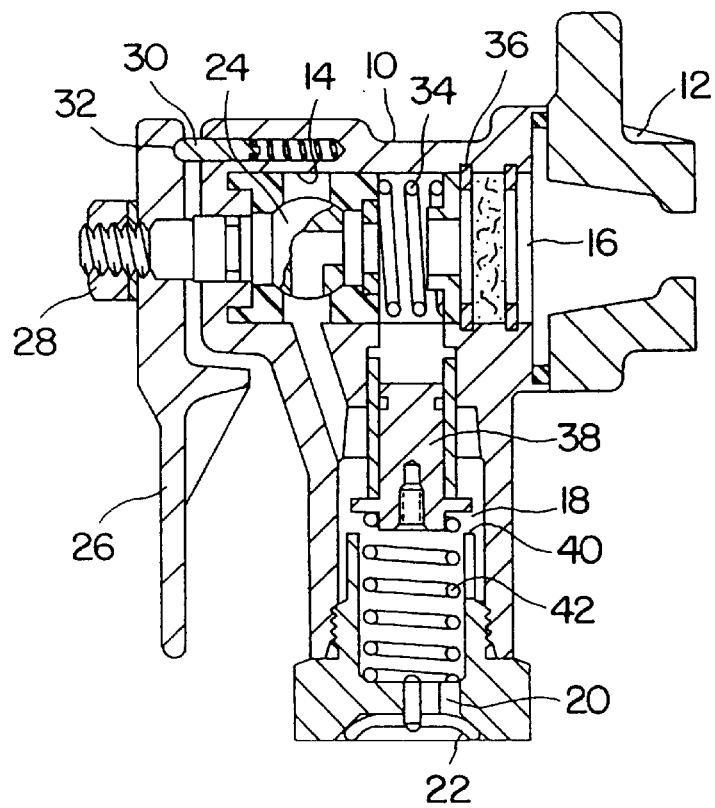
FIG. 1 is a cross-sectional view of a retaining valve of the prior art.
Figure 3:
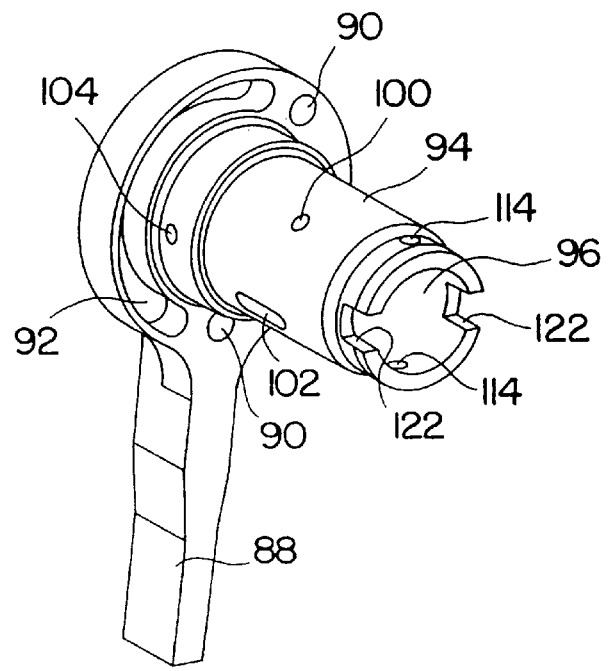
FIG. 3 is a perspective view of the unitary handle valve element according to the principles of the present invention.
Figure 2:
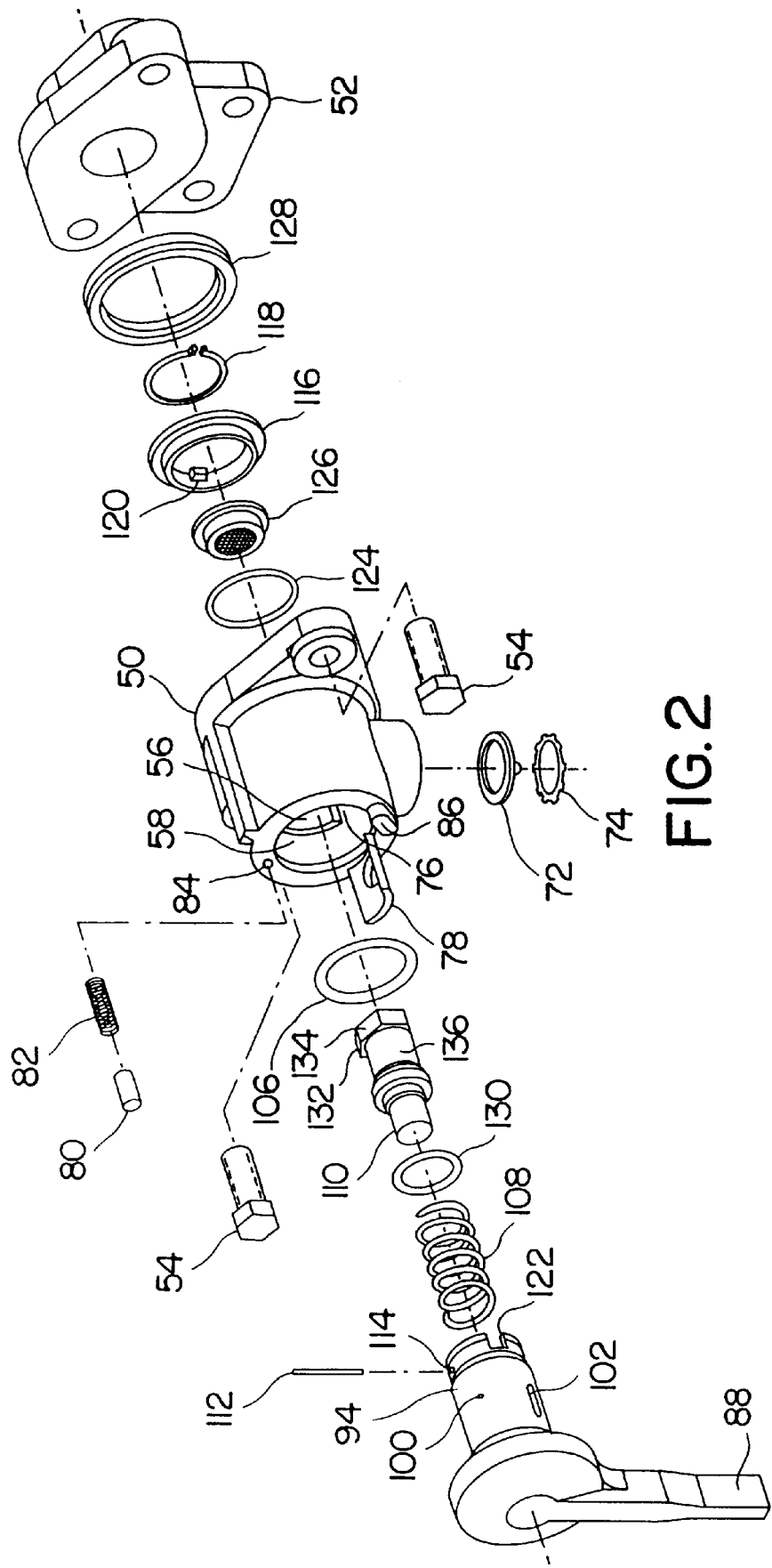
FIG. 2 is an exploded perspective of a retaining valve incorporating the principles of the present invention.

A retaining valve according to the present invention is illustrated in FIGS. 2–6. The retaining valve includes a body 50 mounted to a mounting bracket 52 by fasteners 54. The body 50 includes a first bore 56 having a counterbore 58 at its first end and counterbores 60, 62 and 64 at its second end adjacent inlet 66. An outlet bore 68 connects the first bore 56 to outlet 70. An outlet or exhaust cap 72 is secured to the body 50 by retaining ring 74 received in the body 50. A slot 76 in bore 56 receives seal 78 which extends about outlet bore 68.

A detent 80 and a spring 82 are received in bore 84 of the body 50. A stop 86 also extends from the body 50. The detent and stop cooperates with a handle 88. As shown specifically in FIG. 3, the handle 88 includes three holes 90 (only two of which are shown) to receive the detent 80 to lock the handle 88 in three angular positions corresponding to the three angular positions of the valve element 94 corresponding to the direct exhaust, slow direct and high pressure retain positions. A race 92 also in the handle 88 receives the stop 86 on the body. The end walls of the race 92 define the limits or the first and second position namely, the direct exhaust position and the slow direct position of the handle 88 and valve element 94.

As illustrated, the valve element 94 is a unitary one piece with the handle 88. The valve element 94 has three passages, angularly spaced around the periphery of the valve element 94 and connecting the internal bore 96 of the valve element 94 to the bore 56 of the body 50. These passages include passage 98 shown in FIG. 4 for direct exhaust, passage 100 shown in FIG. 5 for slow direct and passage 102 shown in FIG. 6 for high pressure retain. Passage 100 is restricted compared to passage 98 for the slow direct compared to the direct exhaust. Passage 102 is smaller and is also considered restricted compared to passage 100 and represents the high pressure retained. The passage 102 includes a slot 102a which connects 102 to the outlet bore 68. The other passages 98 and 100 are aligned with the outlet bore 68. A fourth passage 104 between the bore 96 of the valve 94 and bore 56 of the body 50 provides for venting in the spring cavity in bore 56. An O-ring 106 is captured between the handle 88 and the counterbore 58 of the body 50.

A spring 108 and a slide 110 are received in bore 96 of the valve element 94. A stop or pin 112 extends across the bore 96 through opposed openings 114 in the valve element 94. A retaining ring 116 is concentric about the valve element 94 and includes a radial flange which engages counterbore 62 of the body. A snap ring 118 in a recess in the valve element 94 secures the retaining ring 116 to the valve element 94. The combination of retaining ring 116 and snap ring 118 retains the valve element 94 in the body 50. The retaining ring 116 includes a pair of opposed tabs 120 received in slots 122 of the valve element 94 such that the retaining ring 116 rotates with the valve element 94. An O-ring 124 is in counterbore 60 and secured thereto by the retaining ring 116.

An inlet cap 126 is an interference fit in the bore 96 and includes a screen or filter at the inlet 66. A gasket 128 is provided in counterbore 64 and seals against the mounting bracket 52.

A seal or O-ring 130 is provided on the slide 110. A land 132 at the inlet end of the slide 110 includes a plurality of flats 134 to allow the inlet air to circulate past the lands 132 into bore 96 of the valve element 94. A recess 136 is provided between the land 132 and the seal 130. A bore 138 is provided in the slide 110.

Figure 4:
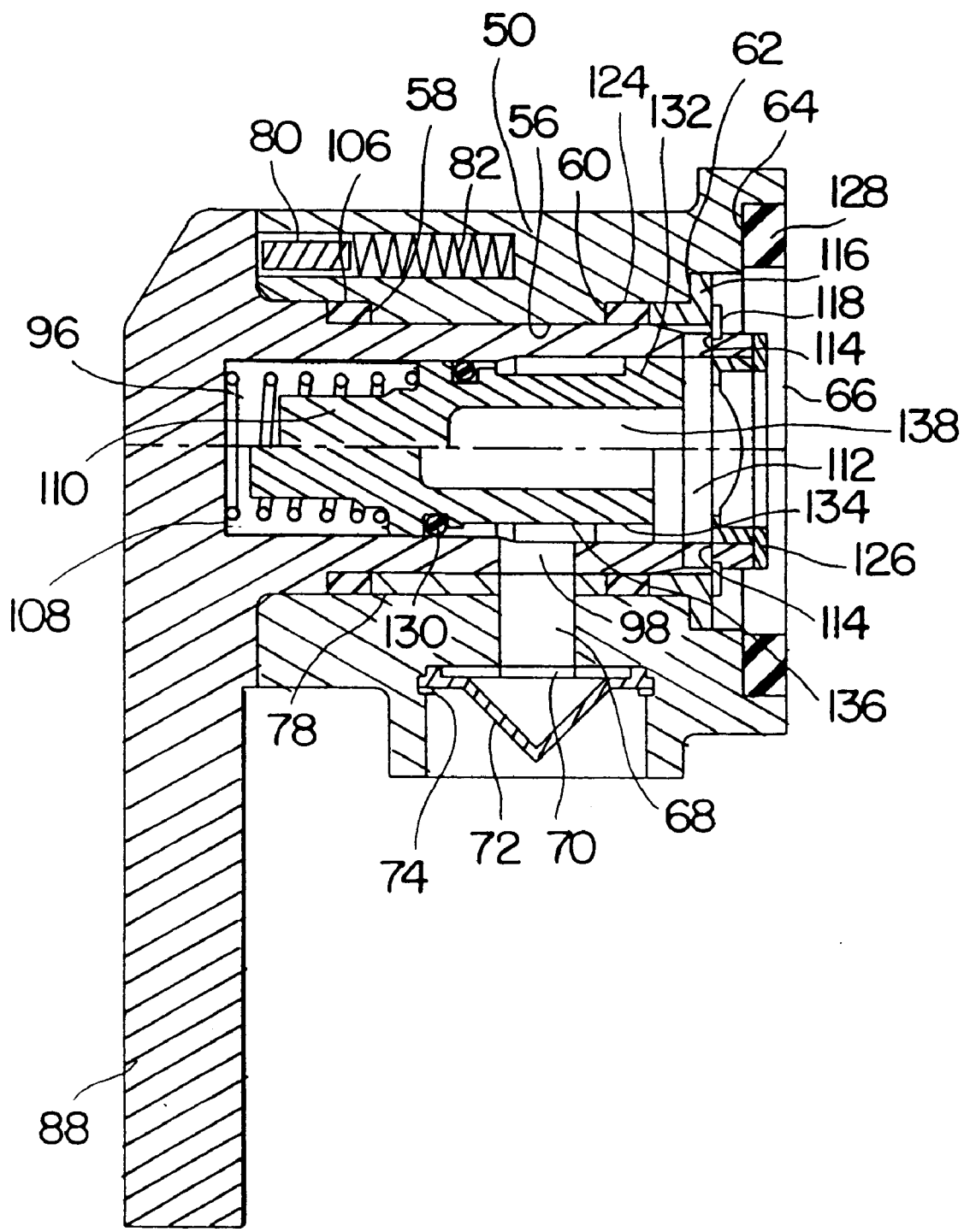
FIG. 4 is a cross-sectional view of the assembled valve of FIG. 2 in the direct exhaust condition.

The operation of the retaining valve in the three angular positions will be described with respect to FIGS. 4, 5 and 6. The slide 110 is shown split with the top half of the slide being with no air pressure at the inlet 66 and with the bottom half being at an inlet pressure greater than the minimum desired retainer pressure, which for example, may be 20 PSIG. A quick review of FIGS. 4–6 indicates that the seal 130 on the slide 110 is past the connection of the passages 98 and 100 of the valve element 94 with respect to the inlet 66 for all positions of the slide 110. This seal is only past the connection of the passage 102 with respect to inlet 66 when the inlet pressure is above the minimum level as illustrated in FIG. 6.

In the direct exhaust position of the handle 88 in its vertically downward position, passage 98 is aligned with outlet bore 68. Retaining air at inlet 66 through inlet cap 126 enters the bore 138 in the slide 110 as well as passing over flats 134 to recess 136. The air then exits through passage 98, outlet bore 68, outlet 70 and outlet cap 72. The air pressure actuates the slide 110 moving it against spring 120. This movement of the slide 110 and the seal 130 thereon does not affect the direct exhaust path just described. Passage 100 and 102 are blocked and are not connected to the outlet bore 68.

Figure 5:
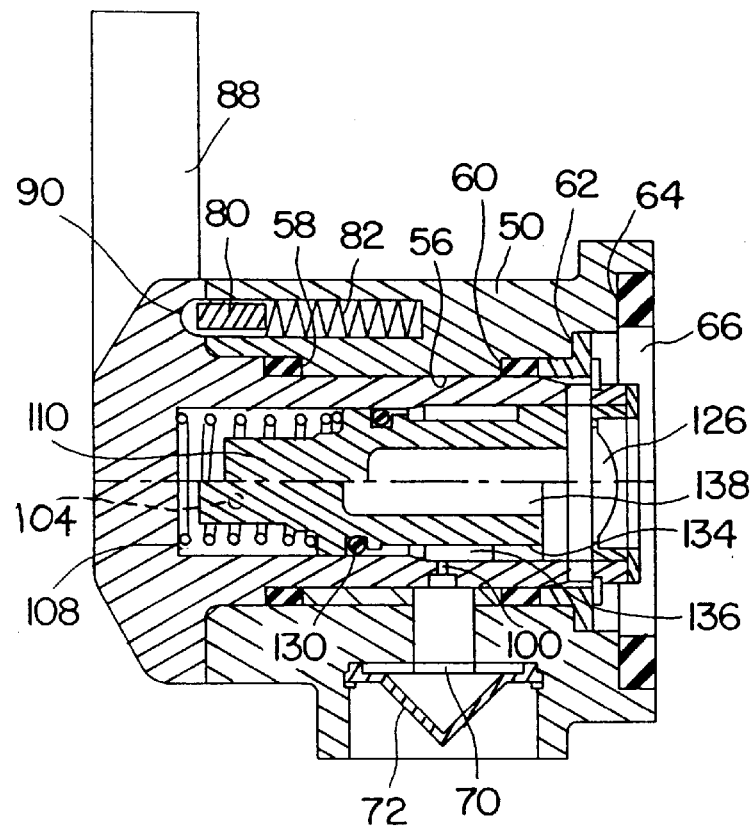
FIG. 5 is a cross-sectional view of the assembled valve of FIG. 2 in the slow direct position.

For slow direct as illustrated in FIG. 5, the handle 88 is at approximately 140° degrees left of the vertical. Passage 100 is aligned with the exit bore 68. Retaining air at inlet 66 through inlet cap 126 enters bore 138 in the slide 110 as well as passing over flats 134 to recess 136. The air then exits through passage 100, outlet bore 68, outlet 70 and outlet cap 72. Passage 110 is restricted compared to passage 98. As in the direct exhaust, the slide 110 moves against spring 108 but does not contribute to the exhaust rate. Passage 98 and 102 are blocked and are not connected to the outlet bore 68.

Figure 6:
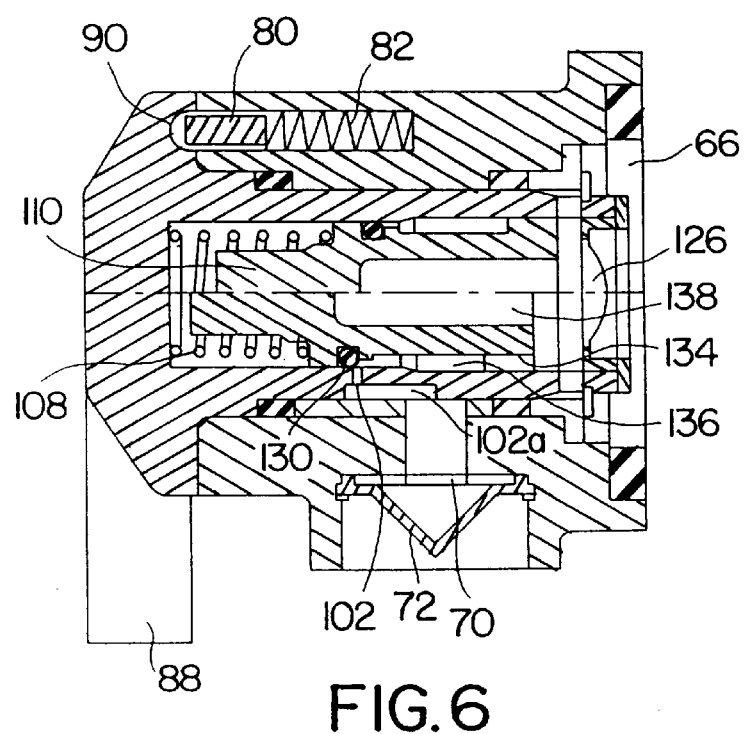
FIG. 6 is a cross-sectional view of the assembled valve and its high pressure retain position.

With the handle 88 approximately 60° degrees to the left of vertical as shown in FIG. 6, the passage 102 and 102a are aligned with the outlet bore 68. The retaining air through inlet 66 and inlet cap 126 enters bore 138 as well as passing over flats 134 to recess 136. The air then exits through 102, recess 102a and outlet bore 68, outlet 70 and through outlet cap 72. As long as the pressure in inlet bore 66 is above the designed pressure allowing the gasket 130 to move from the inlet past bore 102. This pressure is about the range of 16 to 22 PSIG. When the inlet pressure at inlet 66 falls within the 16 to 22 PSIG range, the spring 108 forces the slide 110 back to the right causing seal 103 to restrict passage 102, seal it or finally move to the right of it, cutting off the flow from the inlet 66 to the outlet bore 70. As previously discussed, preferably the body 50, the handle 88, the valve element 94 as well as the retaining ring 116 and detent 80 are preferably made of plastic, for example, Verton MFX-700-10HS. Other composite plastic materials may be used. The handle 88 and the valve element 94 are molded as a unitary one piece member. Alternatively, the handle and the valve element may be made as two pieces although not preferred, while still taking advantage of the other features of the present invention.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A retaining valve including a body having an inlet and outlet each communicating with a first bore; a valve element having a second bore and rotatable in the first bore; the valve element having a first angular position communicating the inlet to the outlet through a first passage in the valve element, a second angular position communicating the inlet to the outlet through a second passage in the valve element and having a restricted flow compared to the first passage and a third angular position connecting the inlet to the outlet through a third passage and having a restricted flow compared to the second passage; a slide in the second bore to uncover the third passage connecting the first and second bores for an inlet pressure above a minimum level; wherein the slide has a first end positioned between a first end of the second bore adjacent the inlet and the connection of the first, second and third passages to the second bore and has a second end positioned between a second end of the second bore and the connection of the first, second and third passages to the second bore; and a seal is in a recess on the slide at a position on the slide which is between the second end of the second bore and the connection of the first and second passages to the second bore with respect to the inlet for all positions of the slide and which is between the second end of the second bore and the connection of the third passage to the second bore only when the inlet pressure is above the minimum level.

2. A retaining valve according to claim 1, wherein the body, valve element and slide are plastic.

3. A retaining valve according to claim 1, wherein the handle is a unitary one piece with the valve element.

4. A retaining valve according to claim 1, wherein the handle includes a race having first and second ends and the body includes a stop riding in the handle race and engaging the ends of the race at the first and second angular positions of the valve element respectively.

5. A retaining valve according to claim 1, including a detent between the handle and the body locking the valve element in the first, second and third angular positions.

6. A retaining valve according to claim 1, including a retainer securing the valve element to the body with respect to axial movement.

7. A retaining valve including a body having an inlet and outlet each communicating with a first bore; a valve element having a second bore and rotatable in the first bore; the valve element having a first angular position communicating the inlet to the outlet through a first passage in the valve element, a second angular position communicating the inlet to the outlet through a second passage in the valve element and having a restricted flow compared to the first passage and a third angular position connecting the inlet to the outlet through a third passage and having a restricted flow compared to the second passage; a slide in the second bore to uncover the third passage connecting the first and second bores for an inlet pressure above a minimum level; wherein:

a retainer secures the valve element to the body with respect to axial movement; and the retainer includes a first ring concentric to the valve element and having a first portion extending into the first bore and a radial flange engaging the body at a first face of the flange, and a snap ring mounted on the valve element adjacent a second face of the flange.

8. A retaining valve according to claim 7, wherein the first ring is fixed to rotate with the valve element.

9. A retaining valve according to claim 7, including a spring between a first end of the slide and an end wall of the second bore and a stop in the second bore adjacent a second end of the slide.

10. A retaining valve according to claim 9, wherein the stop includes a pin extending from the valve element across the second bore.

11. A retaining valve according to claim 10, wherein the first ring is concentric to and retains the pin on the valve element.

12. A retaining valve according to claim 7, wherein the body, valve element and slide are plastic.

13. A retaining valve according to claim 7, wherein the handle is a unitary one piece with the valve element.

14. A retaining valve including a body having an inlet and outlet each communicating with a first bore; a valve element having a second bore and rotatable in the first bore by a handle; the valve element having a first angular position communicating the inlet to the outlet through a first passage in the valve element, a second angular position communicating the inlet to the outlet through a second passage in the valve element and having a restricted flow compared to the first passage and a third angular position connecting the inlet to the outlet through a third passage and having a restricted flow compared to the second passage; a slide in the second bore to uncover the third passage connecting the first and second bores for an inlet pressure above a minimum level; wherein:

the handle includes a race having first and second ends and the body includes a stop riding in the race and engaging the ends of the race at the first and second angular positions of the valve element respectively; and the handle includes three holes and the body includes a detent cooperating with the holes to lock the valve element in the first, second and third angular positions.

15. A retaining valve according to claim 14, including a detent between the handle and the body locking the valve element in the first, second and third angular positions.

16. A retaining valve according to claim 14, wherein the body, valve element and slide are plastic.

17. A retaining valve according to claim 14, wherein the handle is a unitary one piece with the valve element.

18. A retaining valve according to claim 17, including a retainer securing the valve element to the body with respect to axial movement.

19. A retaining valve including a body having an inlet and outlet each communicating with a first bore; a valve element having a second bore and rotatable in the first bore; the valve element having a first angular position communicating the inlet to the outlet through a first passage in the valve element, a second angular position communicating the inlet to the outlet through a second passage in the valve element and having a restricted flow compared to the first passage and a third angular position connecting the inlet to the outlet through a third passage and having a restricted flow compared to the second passage; a slide in the second bore to uncover the third passage connecting the first and second bores for an inlet pressure above a minimum level; wherein:

the valve element includes at least one slot;

a retainer secures the valve element to the body with respect to axial movement; and the retainer includes a) a first ring concentric to the valve element, having a tab in the slot, and having a first face engaging the body, and b) a snap ring mounted on the valve element adjacent a second face of the first ring.

20. A retaining valve according to claim 14, wherein the race and the holes are on a common face of the handle.

* * * * *